US012591916B2

(12) United States Patent (10) Patent No.: US 12,591,916 B2
Norieda et al. (45) Date of Patent: Mar. 31, 2026

(54) VIRTUAL SPACE CHANGING APPARATUS, VIRTUAL SPACE CHANGING METHOD, AND STORAGE MEDIUM

(71) Applicant: NEC Corporation, Tokyo (JP)

(72) Inventors: Shin Norieda, Tokyo (JP); Shogo Akasaki, Tokyo (JP); Katsuhiko Kumagai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 97 days.

(21) Appl. No.: 18/221,204

(22) Filed: Jul. 12, 2023

(65) Prior Publication Data

US 2024/0020742 A1 Jan. 18, 2024

(30) Foreign Application Priority Data

Jul. 14, 2022 (JP) .................................. 2022-113349

(51) Int. Cl.
G06Q 30/0601 (2023.01)
(52) U.S. Cl.
CPC ................................. G06Q 30/0617 (2013.01)
(58) Field of Classification Search
CPC .................................................. G06Q 30/0617
USPC ................................................ 705/26.1–27.2
See application file for complete search history.

(56) References Cited

U.S. PATENT DOCUMENTS 5,926,179 A 7/1999 Matsuda et al.
8,200,578 B2 * 6/2012 Hill ......................... G06Q 40/00
705/40

2007/0035548 A1 * 2/2007 Jung ........................ G06Q 40/02
705/26.1
2010/0241512 A1 * 9/2010 Tirpak ............... G06Q 30/0251
705/26.1
2012/0123890 A1 * 5/2012 Nathan .................. G06Q 90/20
705/26.1
2013/0093869 A1 4/2013 Inagawa et al.
2018/0350144 A1 * 12/2018 Rathod ............. G06Q 20/3224
(Continued)

FOREIGN PATENT DOCUMENTS

JP H10-154053 A 6/1998
JP 2002-197376 A 7/2002
JP 2009-223650 A 10/2009
(Continued)

OTHER PUBLICATIONS

Improving Humanness of Virtual Agents and Users Cooperation Through Emotions (Year: 2021).*

(Continued)

*Primary Examiner* — Ashley D Preston
(74) *Attorney, Agent, or Firm* — Sughrue Mion, PLLC

(57) ABSTRACT

In order to attain an example object of providing a service suitable for a user in a virtual space, a virtual space changing apparatus includes: an acquisition section that acquires position information and line-of-sight target information, the position information including a position of a user in a virtual space or a record of the position, and the line-of-sight target information including a line-of-sight target existing in a line-of-sight direction of the user in the virtual space or a record of the line-of-sight target; and a selection section that selects, based on the position information and the line-of-sight target information, a person in charge of dealing with the user in the virtual space.

7 Claims, 8 Drawing Sheets

(56)          References Cited

U.S. PATENT DOCUMENTS

2022/0398652 A1*  12/2022  Armstrong ......... G06Q 30/0643

FOREIGN PATENT DOCUMENTS

| | | |
|---|---|---|
| JP | 2012-008638 A | 1/2012 |
| JP | 2013-084182 A | 5/2013 |
| JP | 2017-167985 A | 9/2017 |
| JP | 2018-013947 A | 1/2018 |
| JP | 2018-036712 A | 3/2018 |
| JP | 2018-522342 A | 8/2018 |
| JP | 2019-106192 A | 6/2019 |
| JP | 2019-160112 A | 9/2019 |
| JP | 2020-160641 A | 10/2020 |
| JP | 2021-039661 A | 3/2021 |
| JP | 2022-036690 A | 3/2022 |
| WO | 2021/229692 A1 | 11/2021 |

OTHER PUBLICATIONS

Content Moderation in Multi-User Immersive Experiences, AR/VR and the Future of Online Speech, published in Information Technology & Innovation Foundation (Year: 2022).*
JP Office Action for JP Application No. 2022-113349, mailed on Feb. 10, 2026 with English Translation.

* cited by examiner

1

ACQUISITION
SECTION   11

SELECTION SECTION   12

S1

START

ACQUIRE POSITION INFORMATION AND
LINE-OF-SIGHT TARGET INFORMATION   S11

SELECT PERSON IN CHARGE OF DEALING WITH
USER   S12

END

VIRTUAL SPACE CHANGING APPARATUS, VIRTUAL SPACE CHANGING METHOD, AND STORAGE MEDIUM

This Nonprovisional application claims priority under 35 U.S.C. § 119 on Patent Application No. 2022-113349 filed in Japan on Jul. 14, 2022, the entire contents of which are hereby incorporated by reference.

TECHNICAL FIELD

The present invention relates to a virtual space changing apparatus, virtual space changing method, and a storage medium.

BACKGROUND ART

Patent Literature 1 discloses a technique for selecting a clerk to deal with a user in a virtual space in which a service is provided.

Patent Literature 1 discloses a virtual space distribution apparatus which selects, while taking into consideration a product in which a user is interested, a customer service style which the user desires, other preferences of the user, and the like, a clerk suitable for the user from among a plurality of virtual clerks of a virtual shop represented on a virtual space.

CITATION LIST

Patent Literature

[Patent Literature 1]
   Japanese Patent Application Publication Tokukai No. 2022-036690

SUMMARY OF INVENTION

Technical Problem

In the virtual space distribution apparatus disclosed in Patent Literature 1, a product in which a user is interested, a customer service style which the user desires, and other preferences of the user are acquired from a user DB. Therefore, in the virtual space distribution apparatus disclosed in Patent Literature 1, it is necessary to store user information in the user DB in advance. Therefore, in a case of a user whose information is not stored in the user DB, it is impossible to select a clerk that is suitable for the user. This causes a problem that it is impossible to provide a service suitable for the user.

An example aspect of the present invention is accomplished in view of the above problem, and its example object is to provide a technique for providing a service suitable for a user in a virtual space.

Solution to Problem

A virtual space changing apparatus according to an example aspect of the present invention includes at least one processor, the at least one processor carrying out: an acquisition process of acquiring position information and line-of-sight target information, the position information including a position of a user in a virtual space or a record of the position, and the line-of-sight target information including a line-of-sight target existing in a line-of-sight direction of the user in the virtual space or a record of the line-of-sight target; a selection process of selecting, based on the position information and the line-of-sight target information, a person in charge of dealing with the user in the virtual space from among persons in charge indicated by person-in-charge information that is stored in a storage apparatus and that includes one or more pieces of feature information pertaining to the person in charge; and an output process of outputting reason information that includes feature information which has contributed to a selection result of the selection process among the one or more pieces of feature information and that indicates a reason that the person in charge has been selected in the selection process.

A virtual space changing method according to an example aspect of the present invention includes: acquiring, by a virtual space changing apparatus, position information and line-of-sight target information, the position information including a position of a user in a virtual space or a record of the position, and the line-of-sight target information including a line-of-sight target existing in a line-of-sight direction of the user in the virtual space or a record of the line-of-sight target; selecting, by the virtual space changing apparatus based on the position information and the line-of-sight target information, a person in charge of dealing with the user in the virtual space from among persons in charge indicated by person-in-charge information that is stored in a storage apparatus and that includes one or more pieces of feature information pertaining to the person in charge; and outputting, by the virtual space changing apparatus, reason information that includes feature information which has contributed to a selection result of the selecting among the one or more pieces of feature information and that indicates a reason that the person in charge has been selected in the selecting.

A storage medium according to an example aspect of the present invention is a non-transitory storage medium storing a program for causing a computer to function as a virtual space changing apparatus, the program causing the computer to carry out: an acquisition process of acquiring position information and line-of-sight target information, the position information including a position of a user in a virtual space or a record of the position, and the line-of-sight target information including a line-of-sight target existing in a line-of-sight direction of the user in the virtual space or a record of the line-of-sight target; a selection process of selecting, based on the position information and the line-of-sight target information, a person in charge of dealing with the user in the virtual space from among persons in charge indicated by person-in-charge information that is stored in a storage apparatus and that includes one or more pieces of feature information pertaining to the person in charge; and an output process of outputting reason information that includes feature information which has contributed to a selection result of the selection process among the one or more pieces of feature information and that indicates a reason that the person in charge has been selected in the selection process.

Advantageous Effects of Invention

According to an example aspect of the present invention, it is possible to provide a service suitable for a user in a virtual space.

BRIEF DESCRIPTION OF DRAWINGS

FIG. 6 is a diagram illustrating an example of a process carried out by a selection section according to the second example embodiment of the present invention.

EXAMPLE EMBODIMENTS

First Example Embodiment

The following description will discuss a first example embodiment of the present invention in detail with reference to the drawings. The present example embodiment is a basic form of example embodiments described later.
(Configuration of Virtual Space Changing Apparatus 1)

Figure 1:
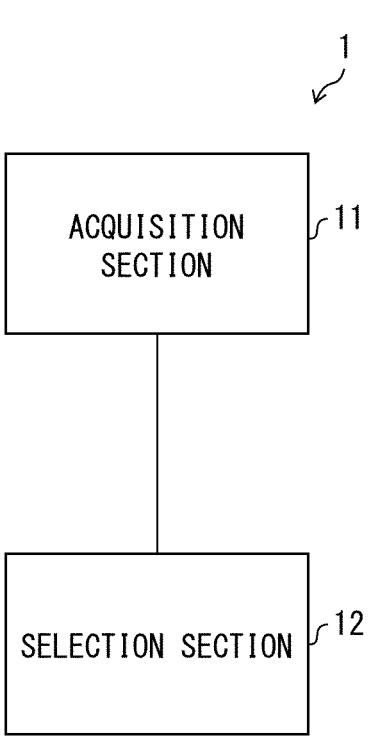
FIG. 1 is a block diagram illustrating a configuration of a virtual space changing apparatus according to a first example embodiment of the present invention.

The following description will discuss a configuration of a virtual space changing apparatus 1 according to the present example embodiment with reference to FIG. 1. FIG. 1 is a block diagram illustrating a configuration of the virtual space changing apparatus 1 according to the present example embodiment.

The virtual space changing apparatus 1 is an apparatus that selects a person in charge of dealing with a user in a virtual space in which a service is provided. As illustrated in FIG. 1, the virtual space changing apparatus 1 includes an acquisition section 11 and a selection section 12. The acquisition section 11 and the selection section 12 are example configurations for realizing the acquisition means and the selection means, respectively, in the present example embodiment.

The acquisition section 11 acquires position information and line-of-sight target information, the position information including a position of a user in a virtual space or a record of the position, and the line-of-sight target information including a line-of-sight target existing in a line-of-sight direction of the user in the virtual space or a record of the line-of-sight target. The acquisition section 11 supplies the acquired position information and line-of-sight target information to the selection section 12.

The selection section 12 selects, based on the position information and the line-of-sight target information which have been supplied from the acquisition section 11, a person in charge of dealing with the user in the virtual space from among persons in charge indicated by person-in-charge information that is stored in a storage apparatus.

As described above, the virtual space changing apparatus 1 according to the present example embodiment employs the configuration of including: the acquisition section 11 that acquires position information and line-of-sight target information, the position information including a position of a user in a virtual space or a record of the position, and the line-of-sight target information including a line-of-sight target existing in a line-of-sight direction of the user in the virtual space or a record of the line-of-sight target; and the selection section 12 that selects, based on the position information and the line-of-sight target information, a person in charge of dealing with the user in the virtual space from among persons in charge indicated by person-in-charge information that is stored in a storage apparatus.

Therefore, the virtual space changing apparatus 1 according to the present example embodiment can identify, based on the position information and the line-of-sight target information, a service in which the user seems to be interested. Then, the virtual space changing apparatus 1 according to the present example embodiment selects a person in charge who is familiar with the service in which the user seems to be interested. Therefore, according to the virtual space changing apparatus 1 of the present example embodiment, it is possible to bring about an example advantage of providing a service suitable for a user in a virtual space.
(Flow of Virtual Space Changing Method S1)

Figure 2:
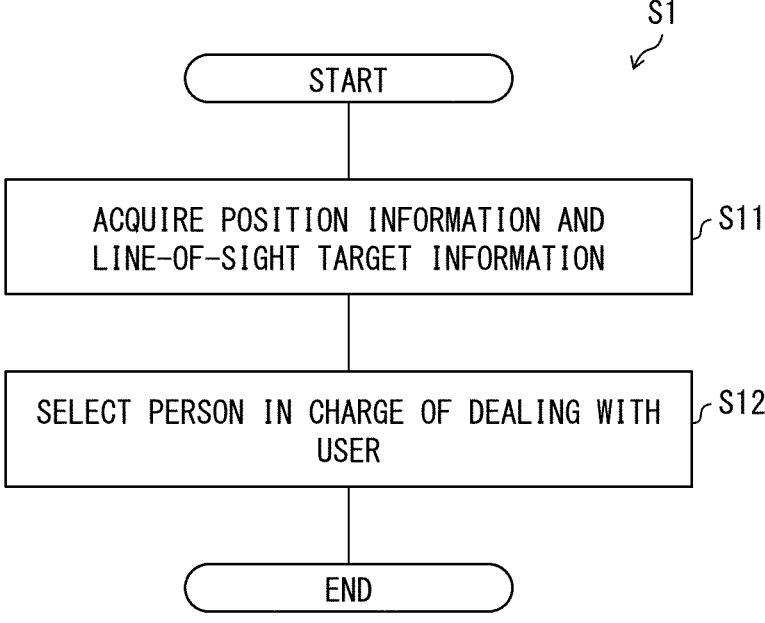
FIG. 2 is a flowchart illustrating a flow of a virtual space changing method according to the first example embodiment of the present invention.

The following description will discuss a flow of a virtual space changing method S1 according to the present example embodiment with reference to FIG. 2. FIG. 2 is a flowchart illustrating the flow of the virtual space changing method S1 according to the present example embodiment.
(Step S11)

In step S11, the acquisition section 11 acquires position information and line-of-sight target information, the position information including a position of a user in a virtual space or a record of the position, and the line-of-sight target information including a line-of-sight target existing in a line-of-sight direction of the user in the virtual space or a record of the line-of-sight target. The acquisition section 11 supplies the acquired position information and line-of-sight target information to the selection section 12.
(Step S12)

In step S12, the selection section 12 selects, based on the position information and the line-of-sight target information which have been supplied from the acquisition section 11, a person in charge of dealing with the user in the virtual space from among persons in charge indicated by person-in-charge information that is stored in a storage apparatus.

As described above, the virtual space changing method S1 according to the present example embodiment employs the configuration of including: acquiring, by the acquisition section 11, position information and line-of-sight target information, the position information including a position of a user in a virtual space or a record of the position, and the line-of-sight target information including a line-of-sight target existing in a line-of-sight direction of the user in the virtual space or a record of the line-of-sight target; and selecting, by the selection section 12 based on the position information and the line-of-sight target information which have been supplied from the acquisition section 11, a person in charge of dealing with the user in the virtual space from among persons in charge indicated by person-in-charge information that is stored in a storage apparatus. Therefore, according to the virtual space changing method S1 of the present example embodiment, an example advantage similar to that of the foregoing virtual space changing apparatus 1 is brought about.

Second Example Embodiment

The following description will discuss a second example embodiment of the present invention in detail with reference to the drawings. The same reference numerals are given to constituent elements which have functions identical with those described in the first example embodiment, and descriptions as to such constituent elements are omitted as appropriate.

In the information processing system 100 according to the present example embodiment, the "virtual space" is a space for providing a service to a user. Examples of the service include a service of selling goods, a financial service, and an educational service. The "person in charge of dealing with the user" is a person who communicates with the user via a virtual space in order to provide a service. Examples of the person in charge include a salesperson in a service of selling goods, a contact staff in a financial service, and a teacher in an educational service.

(Configuration of Information Processing System 100)

Figure 3:
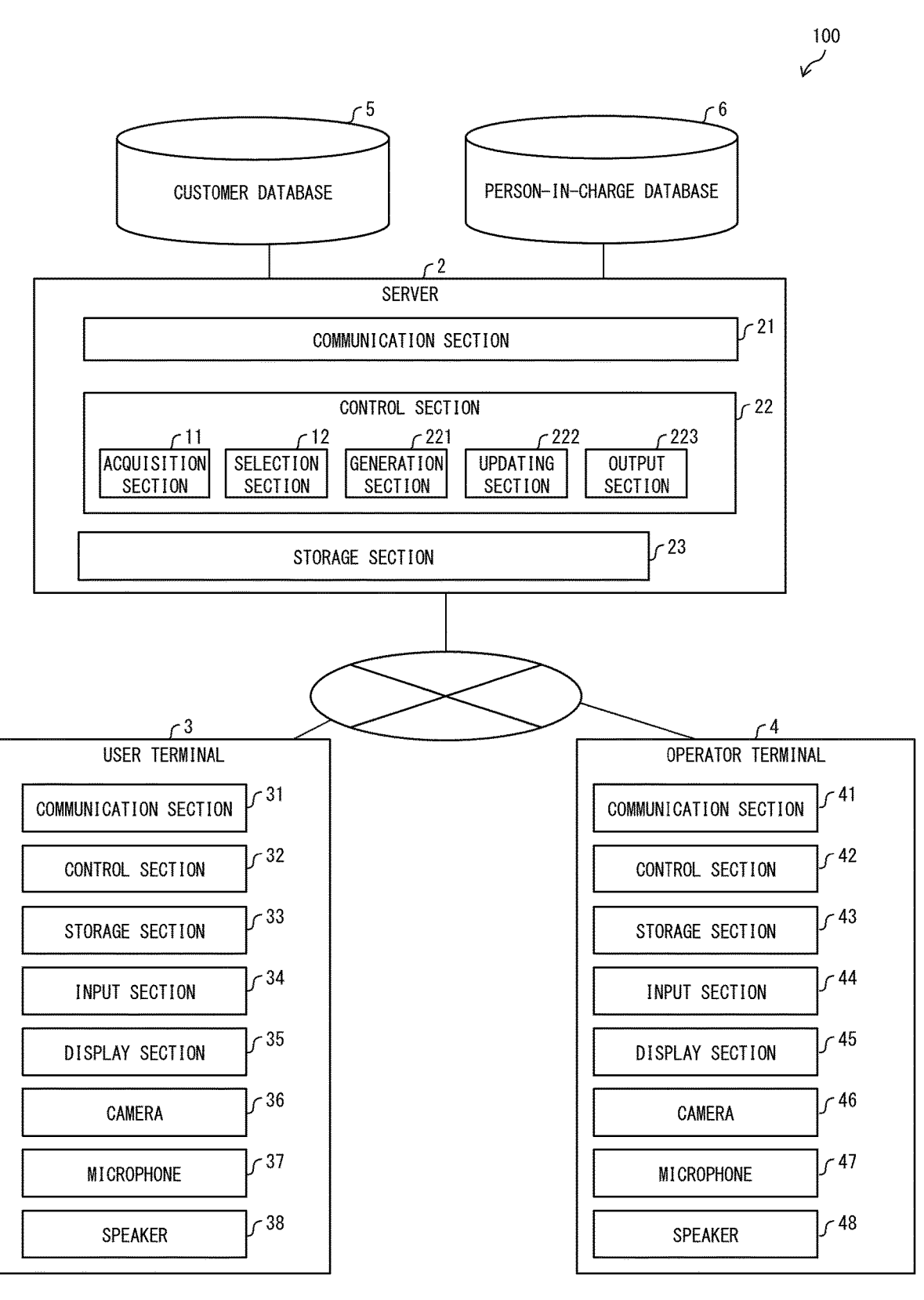
FIG. 3 is a block diagram illustrating a configuration of an information processing system according to a second example embodiment of the present invention.

The following description will discuss a configuration of the information processing system 100 according to the present example embodiment, with reference to FIG. 3. FIG. 3 is a block diagram illustrating the configuration of the information processing system 100 according to the present example embodiment.

As illustrated in FIG. 3, the information processing system 100 is configured to include a server 2, a user terminal 3, an operator terminal 4, a customer database 5, and a person-in-charge database 6. The server 2 and the user terminal 3 are configured to realize the virtual space changing apparatus in the present example embodiment. The person-in-charge database 6 is configured to realize the storage apparatus in the present example embodiment.

In the information processing system 100, as illustrated in FIG. 3, the server 2, the user terminal 3, and the operator terminal 4 are communicably connected to each other via a network. In the information processing system 100, as illustrated in FIG. 3, the customer database 5 and the person-in-charge database 6 are connected to the server 2. The server 2 updates pieces of information which are stored in the customer database 5 and the person-in-charge database 6, and acquires pieces of information which are stored in the customer database 5 and the person-in-charge database 6.

In the information processing system 100, a service is provided to a user by a person in charge of dealing with the user in a virtual space provided by the server 2. A terminal used by the user to use the virtual space is the user terminal 3. A terminal used by the person in charge is the operator terminal 4. Examples of the user terminal 3 and the operator terminal 4 include a personal computer (PC), a tablet, a smart phone, a wearable terminal, and a head mounted display (HMD). As an example, the following description will discuss a case where the user terminal 3 (or the operator terminal 4) is a PC, a tablet, or a smart phone. In this case, the user (or the person in charge) inputs a uniform resource locator (URL) for using a virtual space into a browser that operates on the user terminal 3 (or the operator terminal 4), and thus the user (or the person in charge) can use the virtual space.

For example, in the information processing system 100, an avatar of the user and an avatar of the person in charge are disposed on the virtual space. The user operates the avatar of the user via the user terminal 3, and the person in charge operates the avatar of the person in charge via the operator terminal 4. Here, the person in charge of dealing with the user may be a person or a program (bot).

In the information processing system 100, the server 2 selects a person in charge from a plurality of candidate persons in charge based on pieces of information which are output from the user terminal 3, the operator terminal 4, the customer database 5, and the person-in-charge database 6. Details of the process in which the server 2 selects a person in charge will be described later.

(Configuration of Server 2)

As illustrated in FIG. 3, the server 2 includes a communication section 21, a control section 22, and a storage section 23.

The communication section 21 is a communication module that communicates with an apparatus which is connected to the server 2. For example, the communication section 21 causes the customer database 5 or the person-in-charge database 6 to store information supplied from the control section 22. Moreover, the communication section 21 supplies information stored in the customer database 5 or information stored in the person-in-charge database 6 to the control section 22. Furthermore, the communication section 21 outputs, to the user terminal 3 and the operator terminal 4 which are connected via a network, information supplied from the control section 22. In addition, the communication section 21 supplies pieces of information output from the user terminal 3 and the operator terminal 4 to the control section 22.

The storage section 23 stores data which the control section 22 refers to. For example, the storage section 23 stores position information, line-of-sight target information, purpose information, and feeling information.

(Function of Control Section 22)

The control section 22 controls constituent elements included in the server 2. Moreover, as illustrated in FIG. 3, the control section 22 serves also as an acquisition section 11, a selection section 12, a generation section 221, an updating section 222, and an output section 223. The acquisition section 11, the selection section 12, the generation section 221, the updating section 222, and the output section 223 are configured to realize the acquisition means, the selection means, the generation means, the updating means, and the output means, respectively, in the present example embodiment.

The acquisition section 11 acquires information supplied from the communication section 21. For example, the acquisition section 11 acquires position information and line-of-sight target information, the position information including a position of a user in a virtual space or a record of the position, and the line-of-sight target information including a line-of-sight target existing in a line-of-sight direction of the user in the virtual space or a record of the line-of-sight target. The acquisition section 11 causes the storage section 23 to store the acquired information.

Here, the record of the position of the user in the virtual space indicated by the position information may include, for example, the following information. For example, the record of the position of the user in the virtual space may include (i) a record of a position of a user, who is visiting the virtual space, from a point in time when the user came to the virtual space to this point in time. The record of the position of the user in the virtual space may include (ii) a record of a position of a user in the virtual space during a period in which the user visited the virtual space in the past. The record of the position of the user in the virtual space may include (iii) a record of a position of a user in an overall virtual space (e.g., a town), who is visiting the overall virtual space including the virtual space (e.g., a store), from a point in time when the user came to the overall virtual space to when the user comes to the virtual space. The record of the position of the user in the virtual space may include (iv) a record of a position of a user in another virtual space during a period in which the user visited that another virtual space in order to use another service. For example, in a configuration in which the server 2 generates a virtual space that provides a financial service, the acquisition section 11 may acquire position information indicating a record of a position of a user in a virtual space that provides an educational service, which has been generated by the server 2 or another server. In the descriptions below also, the "record" is not limited to a record in a virtual space that is provided by the server 2.

An example of information included in a record (indicated by line-of-sight target information) of a line-of-sight target which exists in a line-of-sight direction can be similarly described by replacing "a position of the user in the virtual space" with "a line-of-sight target existing in the line-of-sight direction" in the foregoing descriptions of (i) through (iv).

Note that information indicating a record of a position included in the position information or information indicating a record of a line-of-sight target included in the line-of-sight target information described above can be stored in the customer database 5 (described later). The acquisition section 11 may acquire both of or any one of information indicating a current position and information indicating a record of the position. The acquisition section 11 may acquire both of or any one of information of a current line-of-sight target and information indicating a record of the line-of-sight target.

The selection section 12 selects a person in charge of dealing with the user in the virtual space. For example, the selection section 12 selects, based on position information and line-of-sight target information stored in the storage section 23, a person in charge of dealing with the user in the virtual space from among persons in charge indicated by person-in-charge information that is stored in the person-in-charge database 6. Details of the process in which the selection section 12 selects a person in charge and details of person-in-charge information will be described later.

The generation section 221 generates a virtual space. Moreover, the generation section 221 disposes an object in the generated virtual space. Examples of the object include a notice pertaining to a service that is provided in the virtual space. Moreover, the generation section 221 generates an avatar of the user which acts in accordance with an operation by the user of the user terminal 3. Furthermore, the generation section 221 generates an avatar of a person in charge which acts in accordance with an operation by the person in charge who is the user of the operator terminal 4 and who has been selected by the selection section 12.

In addition, the generation section 221 generates, in accordance with operation information indicating operations by the user and the person in charge from respective of the user terminal 3 and the operator terminal 4 with respect to the avatars, a virtual space image which is output to each of the user terminal 3 and the operator terminal 4.

The updating section 222 updates person-in-charge information stored in the person-in-charge database 6. For example, the updating section 222 updates person-in-charge information based on evaluation information which indicates evaluation by the user with respect to the person in charge. An example of the process carried out by the updating section 222 will be described later.

The output section 223 supplies information to the communication section 21 and outputs information. For example, the output section 223 outputs a virtual space image which has been generated by the generation section 221. Moreover, the output section 223 outputs reason information indicating a reason that the selection section 12 has selected the person in charge. Details of the reason information will be described later.

(Configuration of User Terminal 3)

As illustrated in FIG. 3, the user terminal 3 includes a communication section 31, a control section 32, a storage section 33, an input section 34, a display section 35, a camera 36, a microphone 37, and a speaker 38.

The communication section 31 is a communication module that communicates with an apparatus which is connected to the user terminal 3 via a network. For example, the communication section 31 outputs information supplied from the control section 32 to the server 2, and supplies information output from the server 2 to the control section 32.

The control section 32 controls constituent elements included in the user terminal 3. For example, the control section 32 acquires information supplied from the input section 34, an image supplied from the camera 36, and sound information supplied from the microphone 37. Moreover, the control section 32 causes the display section 35 to display an image, and causes a speaker 38 to output sound.

The storage section 33 stores data which the control section 32 refers to.

The input section 34 is an interface that receives input of information. For example, the input section 34 is constituted by any of a mouse, a keyboard, a touch pad, and a combination of these which receive operations by the user. As another example, the input section 34 is constituted by a wearable device that measures a heart rate of the user.

The display section 35 is a display device that displays an image. For example, the display section 35 displays a virtual space image which has been output from the control section 32.

The camera 36 is an imaging device that captures an image. For example, the camera 36 supplies an image obtained by imaging a face of the user to the control section 32.

The microphone 37 is a device that collects sound. For example, the microphone 37 collects a voice uttered by the user and voices of a conversation between the user and the person in charge, and supplies a conversation record indicating the voices to the control section 32. As another example, the microphone 37 collects a voice for operating the avatar of the user, and supplies operation information indicating the voice to the control section 32.

The speaker 38 is a device that outputs sound. For example, the speaker 38 outputs a voice of the person in charge which has been supplied from the control section 32.

(Configuration of Operator Terminal 4)

Constituent elements included in the operator terminal 4 are identical with those included in the user terminal 3 described above. Therefore, descriptions of such constituent elements are omitted here.

(Customer Database 5)

The customer database 5 is a database in which information pertaining to a customer (user) is stored. Examples of information stored in the customer database 5 include a name, an age, and a gender which are attributes of the user, information related to a service that is provided (e.g., an account number, or the like in a case where a financial service is provided in a virtual space), a conversation record, and voice of customer (VoC) information. Here, the conversation record may be a conversational voice, or may be text data obtained by transcription of a conversation and natural language processing which are carried out using existing techniques. The customer database 5 may store (i) information indicating a record of a position among the foregoing position information, (ii) information indicating a record of a line-of-sight target among the foregoing line-of-sight target information, or (iii) information indicating a record of a feeling among feeling information (described later).

(Person-In-Charge Database 6)

The person-in-charge database 6 is a database in which person-in-charge information pertaining to each of a plurality of candidate persons in charge is stored. Examples of person-in-charge information stored in the person-in-charge database 6 include a name, an age, a gender, information indicating a specialized field in a service provided (e.g., insurance, investment, or the like in a case where a financial service is provided in a virtual space), a score of evaluation by a customer, and performance (e.g., a contract amount, the number of orders, or the like in a case where a financial service is provided in a virtual space). Thus, the person-in-charge information includes one or more pieces of feature information pertaining to the person in charge. The person-in-charge database 6 stores operator availability information indicating an operation status, that is, whether or not the person in charge is currently dealing with a customer.

(Example of Displayed Image)

Figure 4:
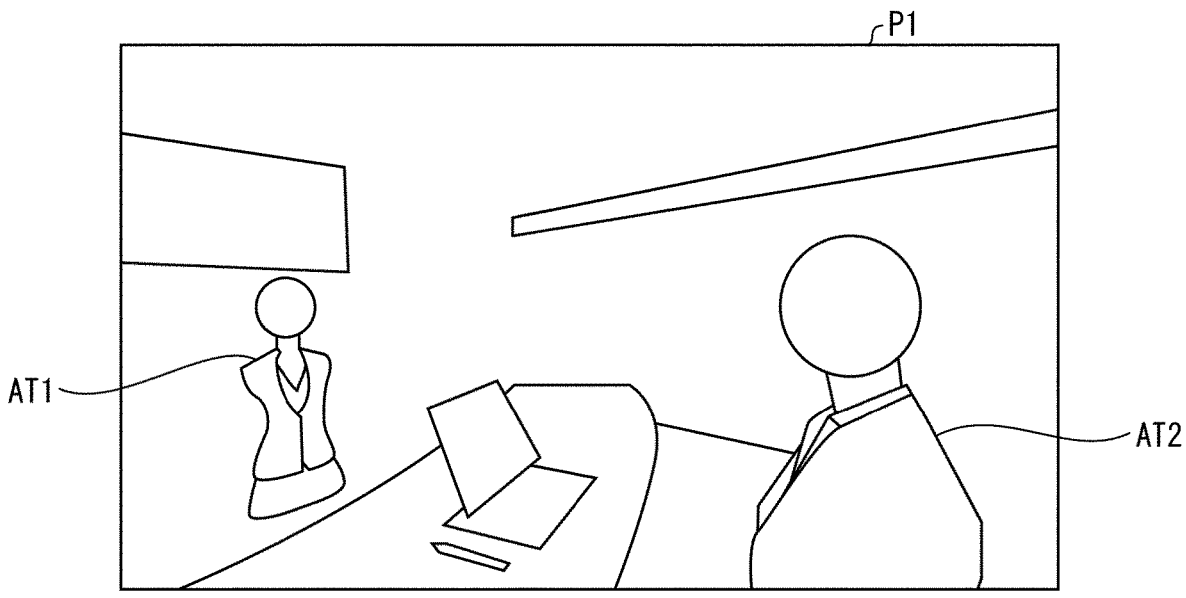
FIG. 4 is a diagram illustrating an example of an image of a virtual space in the information processing system according to the second example embodiment of the present invention.

The following description will discuss an example of a virtual space image generated by the server 2 in the information processing system 100, with reference to FIG. 4. FIG. 4 is a diagram illustrating an example of an image of a virtual space in the information processing system 100 according to the present example embodiment.

An image P1 is an example of an image of a virtual space in which a financial service is provided. As illustrated in the image P1, the virtual space includes an avatar AT1 of a person in charge of providing a service and an avatar AT2 of a user who receives the service. The information processing system 100 may display the image P1 on the display section 35 of the user terminal 3 and on a display section 45 of the operator terminal 4.

The information processing system 100 can be configured to display different images on the display section of the user terminal 3 and on the display section 45 of the operator terminal 4. For example, the display section 35 of the user terminal 3 may display an image which is visible from the avatar AT2 of the user included in the image P1, and the display section 45 of the operator terminal 4 may display an image which is visible from the avatar AT1 of the person in charge included in the image P1.

(Flow of Process S100 in Information Processing System 100)

Figure 5:
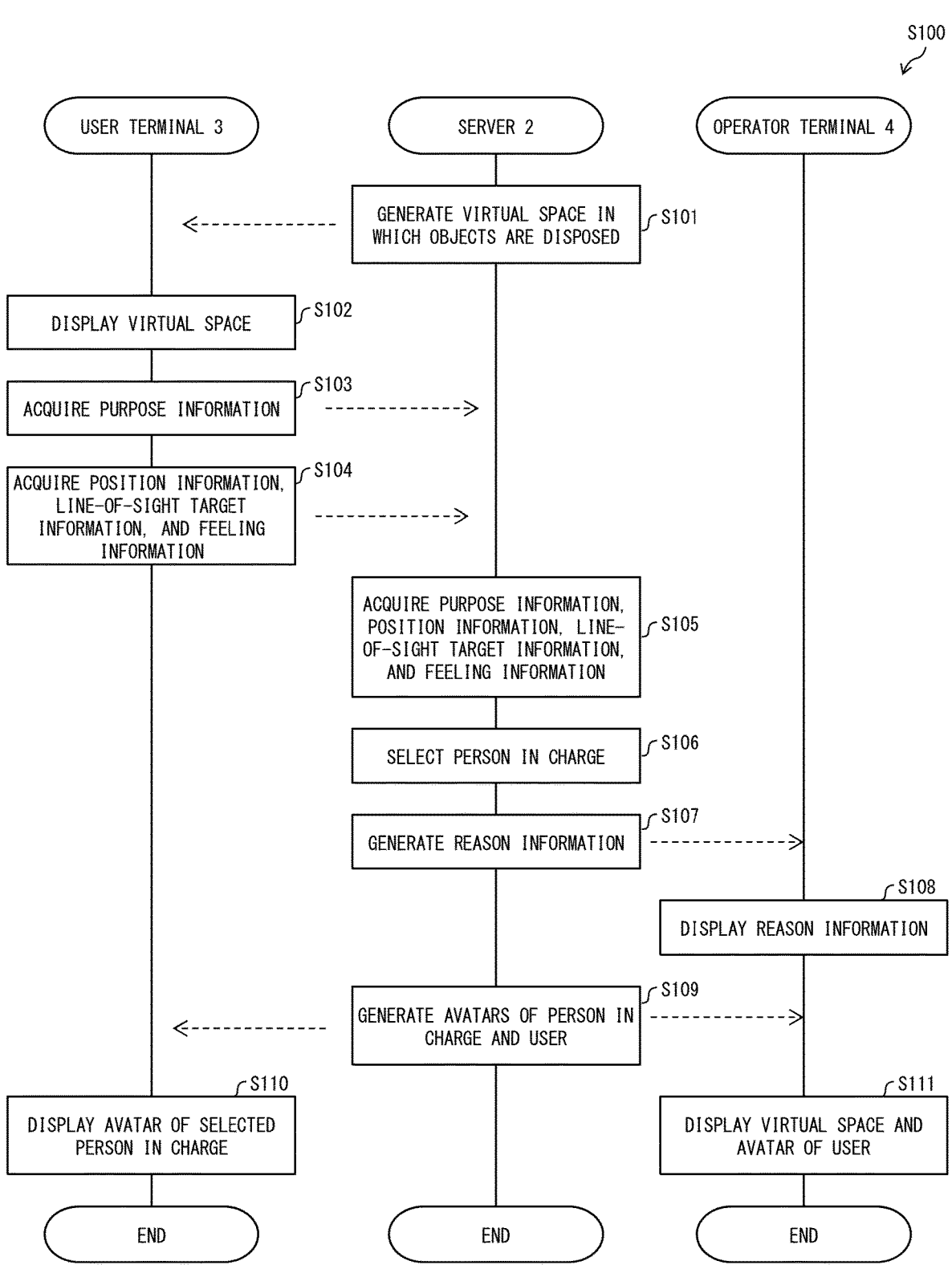
FIG. 5 is a flowchart illustrating a flow of a process in the information processing system according to the second example embodiment of the present invention.

The following description will discuss a flow of a process S100 in the information processing system 100 according to the present example embodiment, with reference to FIG. 5. FIG. 5 is a flowchart illustrating a flow of the process S100 in the information processing system 100 according to the present example embodiment.

(Step S101)

In step S101, the generation section 221 of the server 2 generates a virtual space in which objects are disposed. The generation section 221 supplies the generated virtual space image to the output section 223. The output section 223 outputs, to the user terminal 3, the virtual space image generated by the generation section 221.

(Step S102)

In step S102, the control section 32 of the user terminal 3 acquires the virtual space image which has been output from the server 2. The control section 32 causes the display section 35 to display the acquired virtual space image. As an example of the virtual space image displayed in step S102, the control section 32 may display an image visible from the user when it is assumed that the user is present in the virtual space.

(Step S103)

In step S103, the control section 32 of the user terminal 3 acquires, via the input section 34, purpose information indicating a purpose of the user to use the virtual space. For example, the control section 32 of the user terminal 3 acquires purpose information by outputting information prompting the user to input the purpose information into a reception terminal included as an object in the virtual space. An example of the configuration of outputting information prompting the user to input purpose information includes a configuration in which an image including a selection list is presented so that purpose information is selected. An another example of the configuration of outputting information prompting the user to input purpose information includes a configuration in which an image including an input field is presented so that purpose information is input by text. A still another example of the configuration of outputting information prompting the user to input purpose information includes a configuration in which a voice saying "What can I do for you?" is output. The control section 32 outputs the acquired purpose information to the server 2.

(Step S104)

In step S104, the control section 32 acquires position information and line-of-sight target information.

An example of a method in which the control section 32 acquires position information includes a configuration in which the control section 32 acquires coordinates indicating a position of a user in a world coordinate system of a virtual space. Here, for example, the generation section 221 changes a position and a line-of-sight direction of the user in the world coordinate system of the virtual space based on an operation by the user, and updates a virtual space image which is displayed on the user terminal 3 based on the position and the line-of-sight direction of the user in the virtual space. Then, the control section 32 may acquire, from the generation section 221, the position of the user in the world coordinate system. Note that, in a case where the user terminal 3 is a PC, a tablet, a smart phone, or the like, the operation by the user for changing the position or the line-of-sight direction of the user in the virtual space may be carried out via, for example, a keyboard, a mouse, or a touch pad. In a case where the user terminal 3 is an HMD and a controller, an operation by the user for changing a virtual position may be carried out by an operation of the controller with respect to a movable object disposed in the virtual space. In a case where a gyro sensor or the like is mounted in an HMD, an operation for changing a virtual line of sight may be carried out by changing an orientation of a face together with the worn HMD.

Examples of a method in which the control section 32 acquires line-of-sight target information include a configuration in which the control section 32 identifies a line-of-sight direction in the world coordinate system of the virtual space and identifies a line-of-sight target existing in the line-of-sight direction. For example, as described above, the control section 32 may acquire, from the generation section 221, information indicating a line-of-sight direction in the world coordinate system. Another method can be a configuration in which, in a case where the user terminal 3 is a wearable terminal such as an HMD, the control section 32 identifies a line-of-sight target using a gyro sensor of the wearable terminal. Alternatively a configuration may be employed in which the control section 32 identifies a line-of-sight target included in the center of the virtual space image which is displayed on the display apparatus of the user terminal 3, without identifying a line-of-sight direction in the world coordinate system.

In step S104, the control section 32 may further acquire feeling information including a feeling of the user or a record of the feeling.

Here, the feeling information may include, for example, the following information. For example, the record of the feeling may include (i) a record of a feeling of a user, who is visiting the virtual space, from a point in time when the user came to the virtual space to this point in time. The record of the feeling may include (ii) a record of a feeling of a user during a period in which the user visited the virtual space in the past. The record of the feeling may include (iii) a record of a feeling of a user, who is visiting an overall virtual space (e.g., a town) including the virtual space (e.g., a store), from a point in time when the user came to the overall virtual space to when the user comes to the virtual space. The record of the feeling may include (iv) a record of a feeling of a user during a period in which the user visited another virtual space in order to use another service. For example, in a configuration in which the server 2 generates a virtual space that provides a financial service, the acquisition section 11 may acquire feeling information indicating a record of a feeling of a user in a virtual space that provides an educational service, which has been generated by the server 2 or another server. In the descriptions below also, the "record" is not limited to a record in a virtual space that is provided by the server 2.

The feeling information may be stored in the above described customer database 5.

Examples of a method in which the control section 32 acquires feeling information include a configuration in which a feeling of the user is identified by analyzing a physiological index of the user acquired via the input section 34, a facial expression of the user acquired via the camera 36, a voice acquired via the microphone 37, and content of text input into the input section 34. Examples of the physiological index of the user include pulse waves, brain waves, a heart rate, and perspiration. In a case where the user terminal 3 is an HMD, it is possible to employ a configuration in which the HMD detects a facial expression around a mouth of the user and identifies a feeling of the user.

The control section 32 outputs the acquired position information, line-of-sight target information, and feeling information to the server 2.

(Step S105)

In step S105, the acquisition section 11 of the server 2 acquires purpose information, position information, line-of-sight target information, and feeling information which have been output from the user terminal 3. The acquisition section 11 causes the storage section 23 to store the acquired purpose information, position information, line-of-sight target information, and feeling information.

Here, the acquisition section 11 may acquire both of or any one of (i) feeling information indicating a record of a feeling of the user and (ii) feeling information indicating a current feeling of the user.

(Step S106)

In step S106, the selection section 12 selects, based on position information and line-of-sight target information stored in the storage section 23, a person in charge of dealing with the user in the virtual space from among persons in charge indicated by person-in-charge information that is stored in the person-in-charge database 6. An example of the process in which the selection section 12 selects a person in charge will be described later.

(Step S107)

In step S107, the selection section 12 generates reason information indicating a reason that the person in charge has been selected in step S106. The selection section 12 supplies the generated reason information to the output section 223. The process in which the selection section 12 generates reason information will also be described later. The output section 223 outputs, to the operator terminal 4, the reason information which has been supplied from the selection section 12.

(Step S108)

In step S108, the control section 42 of the operator terminal 4 acquires reason information which has been output from the server 2. The control section 42 causes the display section 45 to display the acquired reason information.

(Step S109)

In step S109, the generation section 221 of the server 2 generates avatars of a person in charge who has been selected by the selection section 12 and the user. The avatar of the person in charge may be stored in advance in the person-in-charge database 6 in association with the person in charge. Alternatively, the avatar of the person in charge may be an avatar that is not related to the selected person in charge. For example, even in a case where the gender of the selected person in charge is male, the generation section 221 may generate a female avatar as an avatar of the person in charge.

The avatar of the user may be generated with reference to an image which has been captured by a camera of the user terminal and includes the user as a subject. Alternatively, the avatar of the user may be generated with reference to user information (such as age and gender) which has been acquired together with purpose information in the foregoing step S103.

The generation section 221 supplies the generated avatars to the output section 223. The output section 223 outputs, to the user terminal 3, the avatar of the person in charge among the avatars supplied from the generation section 221, and outputs, to the operator terminal 4, the avatar of the user and the virtual space image generated in step S101.

Here, in step S109, the generation section 221 may generate a virtual space that is for the person in charge to deal with the user and that is different from a virtual space in which the user has been present until then. For example, the generation section 221 may generate a virtual space of a private room for business negotiations. As another example, the generation section 221 may generate a virtual space suited to a preference of the user with reference to the customer database 5. As still another example, the generation section 221 may generate a virtual space according to motion of the user in the virtual space generated in step S101. For example, in the virtual space generated in step S101, in a case where the user has been positioned only in large places, the generation section 221 may generate a large virtual space in step S109.

(Step S110)

In step S110, the control section 32 of the user terminal 3 acquires the avatar of the person in charge which has been output from the server 2. The control section 32 disposes and displays the acquired avatar in the virtual space displayed in step S102.

(Step S111)

In step S111, the control section 42 of the operator terminal 4 acquires the avatar of the user and the virtual space image which have been output from the server 2. The control section 42 disposes and displays the acquired avatar in the acquired virtual space.

(Process Example 1 Carried Out by Selection Section 12)

Figure 6:
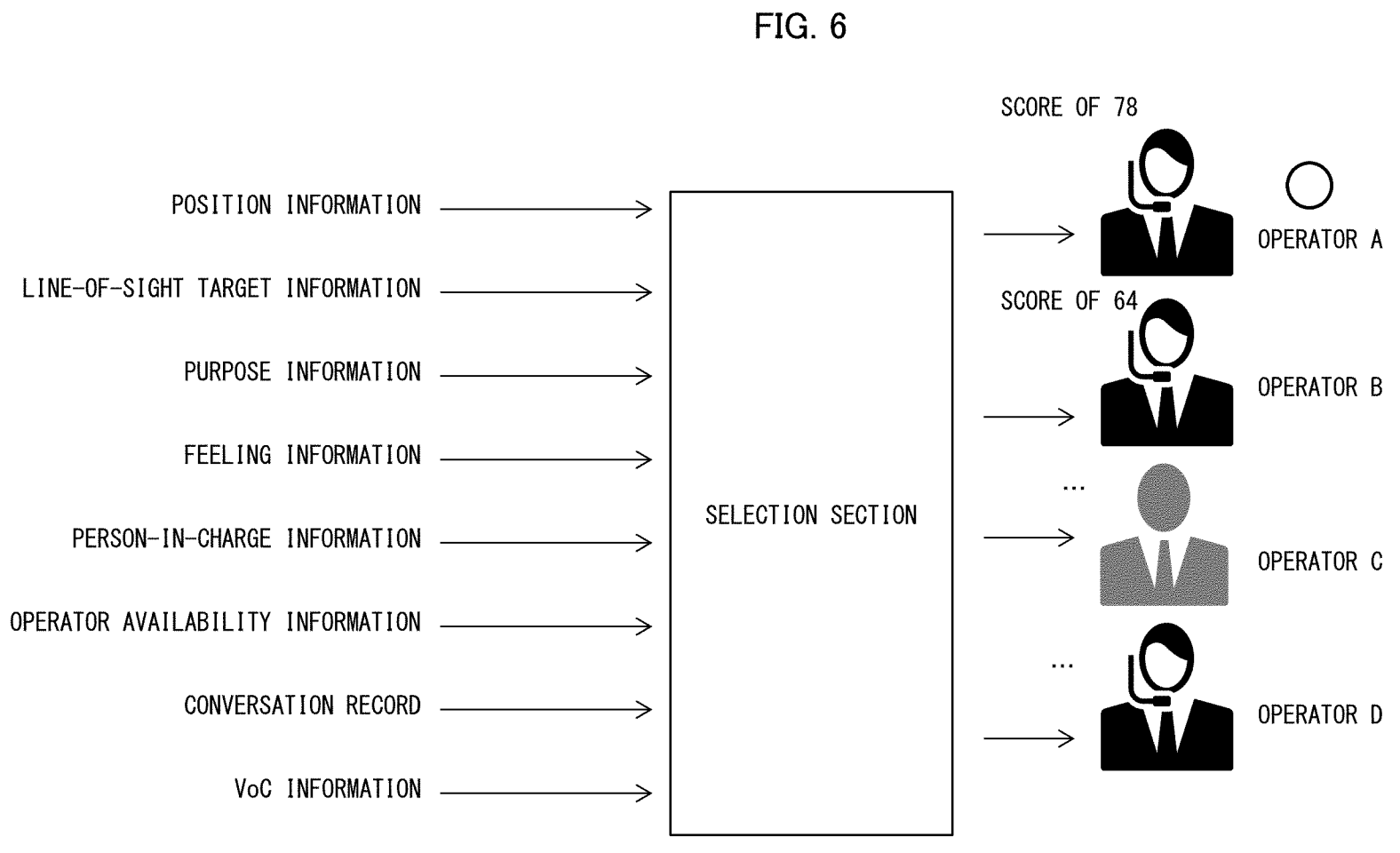

The following description will discuss an example of a process carried out by the selection section 12, with reference to FIG. 6. FIG. 6 is a diagram illustrating an example of the process carried out by the selection section 12 according to the present example embodiment.

In step S106 described above, the selection section 12 selects, based on the position information and the line-of-sight target information, a person in charge of dealing with the user in the virtual space from among persons in charge indicated by person-in-charge information.

The following description will discuss an example in which a person in charge of a product A in which a user is interested is selected. In this example, the position information indicates that the user is or was positioned in front of a notice about the product A, the notice being an object included in the virtual space. Moreover, the line-of-sight target information indicates that the user is or was looking at the notice about the product A. In this case, the selection section 12 selects a person in charge who is specialized in the product A based on the position information and the line-of-sight target information stored in the storage section 23 from among persons in charge indicated by person-in-charge information that is stored in the person-in-charge database 6. Note that the selection section 12 may determine that "the position information indicates that the user has been positioned in front of the notice" based on a statistical analysis result of a record of the position included in the position information. The selection section 12 may also determine that "the line-of-sight target information indicates that the user has been looking at the notice" based on a statistical analysis result of a record of the line-of-sight target included in the line-of-sight target information.

(Process Example 2 Carried Out by Selection Section 12)

In a case where a plurality of persons in charge have been selected by the selection section 12, the selection section 12 may be configured to provide, for each person in charge, a score indicating a degree of contribution to a selection result.

For example, the selection section 12 selects a plurality of persons in charge with reference to position information stored in the storage section 23. Then, the selection section 12 gives scores to the plurality of selected persons in charge.

Similarly, for line-of-sight target information, the selection section 12 selects a plurality of persons in charge with reference to line-of-sight target information stored in the storage section 23. Then, the selection section 12 gives scores to the plurality of selected persons in charge.

Then, the selection section 12 adds up scores given to each person in charge, and selects a person in charge with the highest score. For example, as illustrated in FIG. 6, in a case where a score of an operator A is "78" and a score of an operator B is "64", the selection section 12 selects the operator A as a person in charge.

(Process Example 3 Carried Out by Selection Section 12)

As illustrated in FIG. 6, the selection section 12 may be configured to select a person in charge with further reference to, in addition to the position information and the line-of-sight target information, at least one of purpose information, feeling information, person-in-charge information, operator availability information, a conversation record, and VoC information. The following description will discuss a case in which the selection section 12 has selected a plurality of persons in charge with reference to position information and line-of-sight target information.

For example, the selection section 12 can be configured to select a person in charge based on purpose information stored in the storage section 23. For example, in a case where the purpose information indicates that a purpose is to listen to an explanation of the product A, the selection section 12 selects a person in charge who is most familiar with product content of the product A, from among the plurality of persons in charge who have been selected with reference to the position information and the line-of-sight target information.

As another example, the selection section 12 may be configured to select a person in charge based on feeling information that is stored in the storage section 23 and that includes a feeling of the user or a record of the feeling. For example, in a case where the feeling information indicates that a feeling of the user is anger, the selection section 12 selects a person in charge who is specialized in dealing with claims, from among the plurality of persons in charge who have been selected with reference to the position information and the line-of-sight target information. With this configuration, the server 2 can select a person in charge in accordance with the feeling of the user. Therefore, it is possible to provide a service suitable for the user in the virtual space.

As still another example, the selection section 12 may be configured to select a person in charge based on operator availability information with reference to the person-in-charge database 6. For example, the selection section 12 selects a person in charge who is indicated, by the operator availability information, to be not dealing with a customer, from among the plurality of persons in charge who have been selected with reference to the position information and the line-of-sight target information.

As yet another example, the selection section 12 may be configured to select a person in charge based on a conversation record which is associated with the user with reference to the customer database 5. For example, in a case where (i) the conversation record includes a statement indicating that the user has been satisfied in a conversation with an operator A and (ii) the operator A is included in the plurality of persons in charge selected with reference to the position information and the line-of-sight target information, the selection section 12 selects the operator A as a person in charge.

As still another example, the selection section 12 may be configured to select a person in charge based on VoC information which is associated with the user with reference to the customer database 5. For example, in a case where the VoC information indicates that handling by an operator B has not been satisfactory, the selection section 12 selects a person in charge other than the operator B, from among the plurality of persons in charge who have been selected with reference to the position information and the line-of-sight target information.

As still another example, the selection section 12 may be configured to select a person in charge based on user information that indicates an attribute of the user among pieces of information stored in the customer database 5. For example, in a case where the gender of the user is female, the selection section 12 selects a female person in charge from among the plurality of persons in charge who have been selected with reference to the position information and the line-of-sight target information.

As yet another example, in a case where the language of the user is English, the selection section 12 selects a person in charge having a good command of English, from among the plurality of persons in charge who have been selected with reference to the position information and the line-of-sight target information. Alternatively, in a case where the language of the user is English and an existing translation function can be used, the selection section 12 may select a person in charge who does not have a good command of English.

The selection section 12 may be configured to give, for each person in charge, a score indicating a degree of contribution to selection even in a case where purpose information, feeling information, person-in-charge information, operator availability information, a conversation record, and VoC information are referred to.

(Process Example 4 Carried Out by Selection Section 12)

As illustrated in FIG. 6, the selection section 12 may be configured to select a person in charge with further reference to, in addition to the position information and the line-of-sight target information, a reaction of the user in the virtual space.

For example, it is possible to employ a configuration in which, when the user starts to use the virtual space, a greeting which is "May I help you?", "What can I do for you?", or the like is output to the user. The selection section 12 selects a person in charge in accordance with a reaction of the user to such a greeting.

For example, in a case where it has been identified that the user is feeling tense with respect to the greeting (e.g., when a reaction to the greeting is delayed), the selection section 12 selects a person in charge with the highest score of evaluation from customers, from among the plurality of persons in charge who have been selected with reference to the position information and the line-of-sight target information.

(Process Example 5 Carried Out by Selection Section 12)

In step S107 described above, the selection section 12 generates reason information indicating a reason that the person in charge has been selected. For example, the selection section 12 generates reason information including feature information which has contributed to a selection result by the selection section 12 among one or more pieces of feature information included in person-in-charge information.

For example, in a case where a person in charge has been selected for a reason that the person in charge is specialized in the product A, the selection section 12 generates reason information including feature information "specialized in product A" which is included in the person-in-charge information. The selection section 12 supplies the generated reason information to the output section 223. The output section 223 outputs, to the operator terminal 4, the reason information which has been supplied from the selection section 12. For example, the display section 45 of the operator terminal 4 displays an image including text "You are assigned as the person in charge because you are specialized in the product A".

Thus, the server 2 outputs, to the operator terminal 4, reason information indicating a reason that the person in charge has been selected. As such, the server 2 can notify the person in charge of why the person in charge has been selected. Therefore, the person in charge can provide a service suitable for the user.

The output section 223 can be configured to output reason information to the user terminal 3 in addition to or instead of the operator terminal 4. With this configuration, the server 2 can notify the user of what kind of person has been selected as the person in charge. Therefore, it is possible to allow the user to use the service in the virtual space without anxiety.

(Example of Process Carried Out by Updating Section 222)

In the information processing system 100, the user terminal 3 may be configured, upon completion of the process illustrated in FIG. 5, to acquire, from the user, evaluation information indicating evaluation with respect to the person in charge.

For example, when the process illustrated in FIG. 5 is completed, the control section 32 of the user terminal 3 causes the display section 35 to display an image prompting input of evaluation with respect to the person in charge. Then, the control section 32 acquires evaluation information via the input section 34. The control section 32 outputs the acquired evaluation information to the server 2.

Upon acquisition of the evaluation information output from the user terminal 3, the acquisition section 11 of the server 2 supplies the evaluation information to the updating section 222. The updating section 222 updates person-in-charge information stored in the person-in-charge database 6 based on the evaluation information supplied from the acquisition section 11.

Thus, the server 2 can select a more suitable person in charge by updating person-in-charge information stored in the person-in-charge database 6 based on the evaluation information.

Here, when the process illustrated in FIG. 5 is completed, the server 2 may acquire, in addition to the evaluation information, a conversation record acquired via the microphone 37 of the user terminal 3, a conversation record acquired via microphone 37 of operator terminal 4, and VoC information acquired via the input section 34. In this case, the updating section 222 updates conversation records and VoC information stored in the customer database based on the acquired conversation records and VoC information.

Thus, in the information processing system 100 according to the present example embodiment, the server 2 selects a person in charge with reference to purpose information, feeling information, operator availability information, a conversation record, and VoC information, in addition to position information and line-of-sight target information. Therefore, in the information processing system 100 according to the present example embodiment, the server 2 can select a more suitable person in charge, and this makes it possible to provide a service suitable for the user in the virtual space.

Moreover, in the information processing system 100 according to the present example embodiment, information of motion of the user in the virtual space can be acquired. Therefore, it is possible to select a person in charge according to the motion of the user in the virtual space.

In the information processing system 100 according to the present example embodiment, a service can be provided in a virtual space. Therefore, it is possible to allow a person in charge to work remotely. Moreover, in the information processing system 100 according to the present example embodiment, work hours of each person in charge can be taken into consideration in call routing. Therefore, it is possible to improve labor management of persons in charge.

Third Example Embodiment

The following description will discuss a third example embodiment of the present invention in detail with reference to the drawings. Note that the same reference numerals are given to elements having the same functions as those described in the foregoing example embodiments, and descriptions of such elements are omitted as appropriate. (Configuration of Information Processing System 100A)

Figure 7:
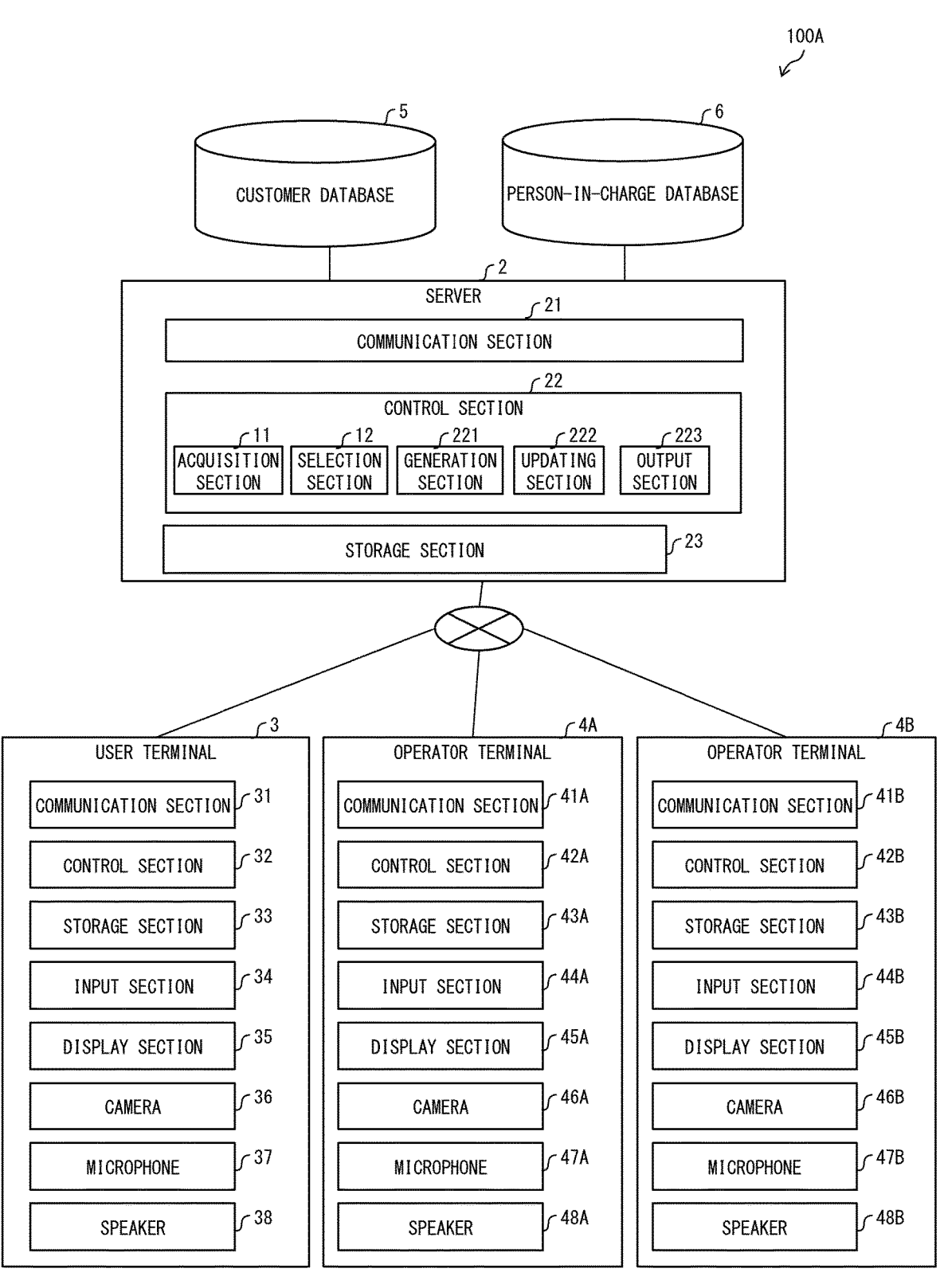
FIG. 7 is a block diagram illustrating a configuration of an information processing system according to a third example embodiment of the present invention.

The following description will discuss a configuration of the information processing system 100A according to the present example embodiment, with reference to FIG. 7. FIG. 7 is a block diagram illustrating the configuration of the information processing system 100A according to the present example embodiment.

As illustrated in FIG. 7, the information processing system 100A is configured to include a server 2, a user terminal 3, a plurality of operator terminals 4 (operator terminal 4A and operator terminal 4B), a customer database and a person-in-charge database 6. The server 2 and the user terminal 3 are configured to realize the virtual space changing apparatus in the present example embodiment. The person-in-charge database 6 is configured to realize the storage apparatus in the present example embodiment.

In the information processing system 100A, the server 2 has, in addition to the functions of the server 2 in the information processing system 100 described above, a function of selecting, while a person in charge is dealing with a user, a different person in charge. Hereinafter, a person in charge who has been selected by the server 2 before dealing with the user is referred to as a first person in charge, and a person in charge who has been selected by the server 2 during dealing with the user is referred to as a second person in charge. (Configuration of Server 2)

As illustrated in FIG. 7, the server 2 includes a communication section 21, a control section 22, and a storage section 23. The communication section 21 and the storage section 23 are as described above.

The control section 22 controls constituent elements included in the server 2. Moreover, as illustrated in FIG. 7, the control section 22 serves also as an acquisition section 11, a selection section 12, a generation section 221, an updating section 222, and an output section 223. The acquisition section 11, the selection section 12, the generation section 221, the updating section 222, and the output section 223 are configured to realize the acquisition means, the selection means, the generation means, the updating means, and the output means, respectively, in the present example embodiment.

The acquisition section 11 acquires information supplied from the communication section 21. For example, the acquisition section 11 acquires position information and line-of-sight target information. Moreover, the acquisition section 11 acquires (i) feeling information including a feeling of the user or a record of the feeling and (ii) feeling information including a feeling of a first person in charge who is dealing with the user or a record of the feeling, the first person in charge having been selected as the person in charge. The acquisition section 11 stores the acquired pieces of information in the storage section 23.

The selection section 12 selects a person in charge of dealing with the user in the virtual space. For example, the selection section 12 selects, based on position information and line-of-sight target information stored in the storage section 23, a person in charge of dealing with the user in the virtual space from among persons in charge indicated by person-in-charge information that is stored in the person-in-charge database 6.

The selection section 12 selects a second person in charge based on information which has been acquired by the acquisition section 11 while a first person in charge who has been selected as the person in charge is dealing with the user in the virtual space, the second person in charge being different from the first person in charge. An example of the process in which the selection section 12 selects the second person in charge will be described later.

The generation section 221 generates a virtual space. Moreover, the generation section 221 disposes objects in the generated virtual space. Moreover, the generation section 221 generates an avatar of the user which acts in accordance with an operation by the user of the user terminal 3. Furthermore, the generation section 221 generates an avatar of the first person in charge which acts in accordance with an operation by the first person in charge who is the user of the operator terminal 4A and who has been selected by the selection section 12. Furthermore, the generation section 221 generates an avatar of the second person in charge which acts in accordance with an operation by the second person in charge who is the user of the operator terminal 4B and who has been selected by the selection section 12.

The updating section 222 updates person-in-charge information stored in the person-in-charge database 6.

The output section 223 supplies information to the communication section 21 and outputs information. For example, the output section 223 outputs reason information indicating a reason that the selection section 12 has selected the first person in charge. Moreover, the output section 223 outputs reason information indicating a reason that the selection section 12 has selected the second person in charge. (Configuration of User Terminal 3)

Constituent elements included in the user terminal 3 are identical with those included in the user terminal 3 in the foregoing example embodiments. Therefore, descriptions of such constituent elements are omitted here. (Configurations of Operator Terminal 4A and Operator Terminal 4B)

Constituent elements included in each of the operator terminal 4A and the operator terminal 4B are identical with those included in the user terminal 3 in the foregoing example embodiments. Therefore, descriptions of such constituent elements are omitted here. (Flow of Process S100A in Information Processing System 100A)

Figure 8:
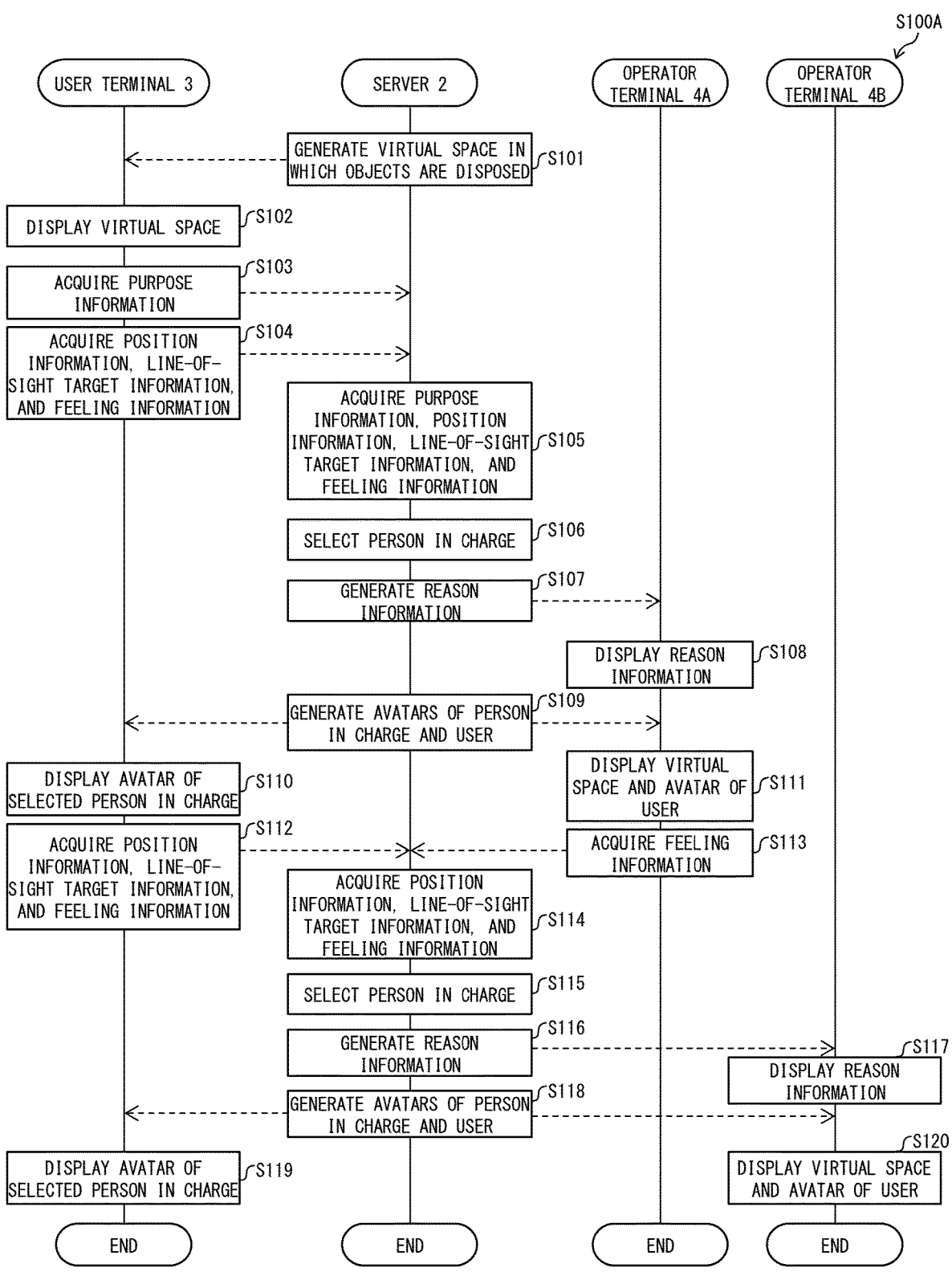
FIG. 8 is a flowchart illustrating a flow of a process in the information processing system according to the third example embodiment of the present invention.

The following description will discuss a flow of a process S100A in the information processing system 100A according to the present example embodiment, with reference to FIG. 8. FIG. 8 is a flowchart illustrating a flow of a process S100A in the information processing system 100A according to the present example embodiment. (Steps S101 Through S111)

The processes in steps S101 through S111 are identical with those described in the foregoing example embodiments. Therefore, descriptions of such processes are omitted here. That is, in steps S101 through S111, the processes until a person in charge (first person in charge) deals with the user are carried out. Processes in and after step S112 are carried out while the first person in charge is dealing with the user. (Step S112)

In step S112, the control section 32 of the user terminal 3 acquires position information of the user, line-of-sight target information of the user, and feeling information of the user. The control section 32 outputs, to the server 2, the acquired position information of the user, line-of-sight target information of the user, and feeling information of the user. (Step S113)

In step S113, the control section 42A of the operator terminal 4A acquires feeling information of the first person in charge. The control section 42A outputs, to the server 2A, the acquired feeling information of the first person in charge. (Step S114)

In step S114, the acquisition section 11 of the server 2 acquires the position information of the user, the line-of-sight target information of the user, the feeling information of the user, and the feeling information of the first person in charge. The acquisition section 11 causes the storage section 23 to store the acquired position information of the user, line-of-sight target information of the user, feeling information of the user, and feeling information of the first person in charge. (Step S115)

In step S115, the selection section 12 selects a person in charge (second person in charge).

The following description will discuss an example in which a person in charge (second person in charge) specialized in a product B is selected while a person in charge (first person in charge) specialized in a product A is dealing with the user. In this example, the position information indicates that the user is or was positioned in front of a notice about the product B. Moreover, the line-of-sight target information indicates that the user is or was looking at the notice about the product B. In this case, the selection section 12 selects a person in charge who is specialized in the product B based on the position information and the line-of-sight target information stored in the storage section 23 from among persons in charge indicated by person-in-charge information that is stored in the person-in-charge database 6. The following description will discuss another example in which the feeling information of the user which has been acquired by the acquisition section 11 in step S114 indicates anxiety while a person in charge (first person in charge) who is specialized in the product A is dealing with the user. In this case, the selection section 12 selects a second person in charge who is more familiar with the product A than the first person in charge.

The following description will discuss still another example in which the feeling information of a person in charge (first person in charge) which has been acquired by the acquisition section 11 in step S114 indicates anxiety while the first person in charge who is specialized in the product A is dealing with the user. In this case, the selection section 12 selects a second person in charge who is more familiar with the product A than the first person in charge. (Step S116)

In step S116, the selection section 12 generates reason information indicating a reason that the second person in charge has been selected in step S115. The selection section 12 supplies the generated reason information to the output section 223. The output section 223 outputs, to the operator terminal 4B, the reason information which has been supplied from the selection section 12. (Step S117)

In step S117, the control section 42B of the operator terminal 4B acquires reason information which has been output from the server 2. The control section 42B causes the display section 45B to display the acquired reason information. Here, the output section 223 may output the reason information which has been supplied from the selection section 12 to at least one of the user terminal 3 and the operator terminal 4A in addition to or instead of the operator terminal 4B. (Step S118)

In step S118, the generation section 221 of the server 2 generates an avatar of the second person in charge who has been selected by the selection section 12 in step S115 and an avatar of the user. Here, the avatar of the user which is generated by the generation section 221 in step S118 may be identical with the avatar of the user which has been generated in step S109.

The generation section 221 supplies the generated avatars to the output section 223. The output section 223 outputs, to the user terminal 3, the avatar of the second person in charge among the avatars supplied from the generation section 221, and outputs, to the operator terminal 4B, the avatar of the user and the virtual space image generated in step S101. (Step S119)

In step S119, the control section 32 of the user terminal 3 acquires the avatar of the person in charge which has been output from the server 2. The control section 32 disposes and displays the acquired avatar in the virtual space displayed in step S102. (Step S120)

In step S120, the control section 42B of the operator terminal 4B acquires the avatar of the user and the virtual space image which have been output from the server 2. The control section 42B disposes and displays the acquired avatar in the acquired virtual space.

Thus, in the information processing system 100A according to the present example embodiment, the server 2 selects a second person in charge based on information which has been acquired while a first person in charge is dealing with the user in the virtual space, the second person in charge being different from the first person in charge. Therefore, in the information processing system 100A according to the present example embodiment, for example, in a case where the user is not satisfied with the first person in charge, the server 2 can reselect a suitable person in charge.

In the information processing system 100A according to the present example embodiment, the server 2 further acquires feeling information including a feeling of the first person in charge or a record of the feeling while the first person in charge is dealing with the user. Therefore, in the information processing system 100A according to the present example embodiment, in a case where the first person in charge himself/herself feels that there is a problem in dealing with the user, it is possible to select a second person in charge who is more suitable for dealing with the user than the first person in charge.

Variation 1

In the information processing system 100A according to the present variation, in a case where a second person in charge different from a first person in charge has been selected while the avatar is acting in accordance with an operation by the first person in charge, the selection section 12 causes the avatar to act in accordance with an operation by the second person in charge instead of the operation by the first person in charge.

For example, in step S118 described above, the generation section 221 does not generate an avatar of the second person in charge who has been selected by the selection section 12 in step S115. Then, in step 118, the output section 223 outputs, to the user terminal 3, the avatar of the first person in charge which has been generated in step S109.

Then, in step S119, the control section 32 of the user terminal 3 acquires the avatar of the first person in charge which has been output from the server 2. The control section 32 disposes and displays the acquired avatar in the virtual space displayed in step S102.

Thus, in the information processing system 100A according to the present variation, in a case where a second person in charge different from a first person in charge has been selected while the avatar is acting in accordance with an operation by the first person in charge, the server 2 causes the avatar to act in accordance with an operation by the second person in charge instead of the operation by the first person in charge. In other words, in the information processing system 100A according to the present variation, the server 2 changes, from the first person in charge to the second person in charge, the person in charge of responding to the user without changing the avatar while the first person in charge is dealing with the user. Therefore, the server 2 can change the person in charge to a more suitable person in charge without making the user aware that the person in charge has been changed. As a result, a degree of satisfaction of the user with respect to handling by the avatar is improved.

Variation 2

In the information processing system 100A according to the present variation, the selection section 12 selects a plurality of persons in charge. Then, the generation section 221 generates a single avatar which acts in accordance with operations by the plurality of persons in charge.

For example, in step S106 described above, the selection section 12 selects, based on position information and line-of-sight target information stored in the storage section 23, a plurality of persons in charge of dealing with the user in the virtual space from among persons in charge indicated by person-in-charge information that is stored in the person-in-charge database 6.

Then, in step S109, the generation section 221 generates a single avatar which acts in accordance with operations by the plurality of persons in charge who have been selected by the selection section 12 and an avatar of the user. The generation section 221 supplies the generated avatars to the output section 223. The output section 223 outputs, to the user terminal 3, the single avatar which acts in accordance with operations by the plurality of persons in charge among the avatars supplied from the generation section 221. Moreover, the output section 223 outputs, to the operator terminal 4A and the operator terminal 4B, the avatar of the user and a virtual space image generated in step S101.

Thus, in the information processing system 100A according to the present variation, the server 2 generates the single avatar which acts in accordance with operations by the plurality of persons in charge. In other words, in the information processing system 100A according to the present variation, even in the case of a plurality of persons in charge, the server 2 causes a single avatar to be displayed on the user terminal 3. Therefore, in a case where the user wants to use a plurality of services, a plurality of persons in charge deal with the user, with use of the single avatar, according to the plurality of services, respectively. Therefore, the server 2 can provide a service without giving pressure to the user. In the information processing system 100A according to the present variation, the server 2 can provide a service without making the user aware that the person in charge changes for each service. That is, the user can feel that the user has been dealt with by a single avatar specialized in the plurality of services. As a result, a degree of satisfaction of the user with respect to handling by the avatar is improved.

Fourth Example Embodiment

The second example embodiment and the third example embodiment have described the examples in which the server 2 and the user terminal 3 are used. However, one or more functions among the functions possessed by the server 2 may be realized by the user terminal 3. In other words, at least any of the acquisition section 11, the selection section 12, the generation section 221, the updating section 222, and the output section 223 included in the control section 22 of the server 2 may be included in the control section 32 of the user terminal 3. The control section 32 of the user terminal 3 may have all of the functions of the acquisition section 11, the selection section 12, the generation section 221, the updating section 222, and the output section 223 included in the control section 22 of the server 2.

Software Implementation Example

The functions of part of or all of the server 2, the user terminal 3, and the operator terminal 4 (4A and 4B) can be realized by hardware such as an integrated circuit (IC chip) or can be alternatively realized by software.

Figure 9:
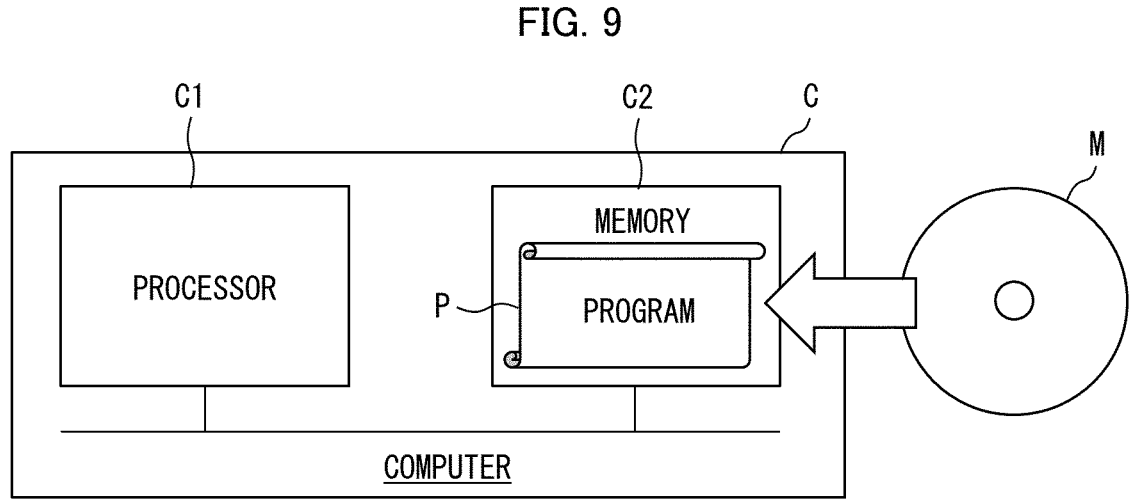
FIG. 9 is a block diagram illustrating an example of a hardware configuration of each of a server, a user terminal, and an operator terminal according to each of the example embodiments of the present invention.

In the latter case, each of the server 2, the user terminal 3, and the operator terminal 4 (4A and 4B) is realized by, for example, a computer that executes instructions of a program that is software realizing the foregoing functions. FIG. 9 illustrates an example of such a computer (hereinafter, referred to as "computer C"). The computer C includes at least one processor C1 and at least one memory C2. The memory C2 stores a program P for causing the computer C to function as the server 2, the user terminal 3, and the operator terminal 4 (4A and 4B). In the computer C, the processor C1 reads the program P from the memory C2 and executes the program P, so that the functions of the server 2, the user terminal 3, and the operator terminal 4 (4A and 4B) are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a microcontroller, or a combination of these. The memory C2 can be, for example, a flash memory, a hard disk drive (HDD), a solid state drive (SSD), or a combination of these.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communications network, a broadcast wave, or the like. The computer C can obtain the program P also via such a transmission medium.

The processes described in the foregoing example embodiments may be carried out by artificial intelligence (AI). In this case, the AI can be operated by the control apparatus or can be operated by another apparatus (for example, an edge computer or a cloud server).

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

Some of or all of the foregoing example embodiments can also be described as below. Note, however, that the present invention is not limited to the following supplementary notes.

Supplementary Note 1

A virtual space changing apparatus, including: an acquisition means that acquires position information and line-of-sight target information, the position information including a position of a user in a virtual space or a record of the position, and the line-of-sight target information including a line-of-sight target existing in a line-of-sight direction of the user in the virtual space or a record of the line-of-sight target; and a selection means that selects, based on the position information and the line-of-sight target information, a person in charge of dealing with the user in the virtual space from among persons in charge indicated by person-in-charge information that is stored in a storage apparatus.

Supplementary Note 2

The virtual space changing apparatus according to supplementary note 1, in which: the person-in-charge information includes one or more pieces of feature information pertaining to the person in charge; and the virtual space changing apparatus further includes an output means which outputs reason information that includes feature information which has contributed to a selection result by the selection means among the one or more pieces of feature information and that indicates a reason that the selection means has selected the person in charge.

Supplementary Note 3

The virtual space changing apparatus according to supplementary note 1 or 2, in which: the acquisition means further acquires feeling information that includes a feeling of the user or a record of the feeling; and the selection means selects the person in charge based further on the feeling information.

Supplementary Note 4

The virtual space changing apparatus according to any one of supplementary notes 1 through 3, in which: the selection means selects a second person in charge based on information which has been acquired by the acquisition means while a first person in charge who has been selected as the person in charge is dealing with the user in the virtual space, the second person in charge being different from the first person in charge.

Supplementary Note 5

The virtual space changing apparatus according to supplementary note 4, in which: the acquisition means further acquires feeling information including a feeling of the first person in charge who is dealing with the user or a record of the feeling.

Supplementary Note 6

The virtual space changing apparatus according to supplementary note 4 or 5, further including: a generation means which generates an avatar that acts in accordance with an operation by the first person in charge, in a case where the second person in charge has been selected while the avatar is acting in accordance with an operation by the first person in charge, the selection means causing the avatar to act in accordance with an operation by the second person in charge instead of the operation by the first person in charge.

Supplementary Note 7

The virtual space changing apparatus according to any one of supplementary notes 1 through 6, further including: an updating means that updates the person-in-charge information based on evaluation information that indicates evaluation by the user with respect to the person in charge.

Supplementary Note 8

The virtual space changing apparatus according to any one of supplementary notes 1 through 7, in which: the selection means selects a plurality of persons in charge; and the virtual space changing apparatus further includes a generation means which generates a single avatar that acts in accordance with operations by the plurality of persons in charge.

Supplementary Note 9

A virtual space changing method, including: acquiring, by a virtual space changing apparatus, position information and line-of-sight target information, the position information including a position of a user in a virtual space or a record of the position, and the line-of-sight target information including a line-of-sight target existing in a line-of-sight direction of the user in the virtual space or a record of the line-of-sight target; and selecting, by the virtual space changing apparatus based on the position information and the line-of-sight target information, a person in charge of dealing with the user in the virtual space from among persons in charge indicated by person-in-charge information that is stored in a storage apparatus.

Supplementary Note 10

A program for causing a computer to function as a virtual space changing apparatus, the program causing the computer to function as: an acquisition means that acquires position information and line-of-sight target information, the position information including a position of a user in a virtual space or a record of the position, and the line-of-sight target information including a line-of-sight target existing in a line-of-sight direction of the user in the virtual space or a record of the line-of-sight target; and a selection means that selects, based on the position information and the line-of-sight target information, a person in charge of dealing with the user in the virtual space from among persons in charge indicated by person-in-charge information that is stored in a storage apparatus.

Supplementary Note 11

A virtual space changing apparatus including at least one processor, the at least one processor carrying out: an acquisition process of acquiring position information and line-of-sight target information, the position information including a position of a user in a virtual space or a record of the position, and the line-of-sight target information including a line-of-sight target existing in a line-of-sight direction of the user in the virtual space or a record of the line-of-sight target; and a selection process of selecting, based on the position information and the line-of-sight target information, a person in charge of dealing with the user in the virtual space from among persons in charge indicated by person-in-charge information that is stored in a storage apparatus.

Note that the virtual space changing apparatus can further include a memory. The memory can store a program for causing the at least one processor to carry out the acquisition process and the selection process. The program can be stored in a computer-readable non-transitory tangible storage medium.

REFERENCE SIGNS LIST

1: Virtual space changing apparatus
2, 2A: Server
3: User terminal
4, 4A, 4B: Operator terminal
5: Customer database
6: Person-in-charge database
11: Acquisition section
12: Selection section
100, 100A: Information processing system
221: Generation section
222: Updating section
223: Output section

The invention claimed is:

1. A virtual space changing apparatus comprising:
a server including a communication interface;
a storage section; and
at least one processor, wherein
the storage section stores person-in-charge information of a plurality of persons in charge, the person-in-charge information including one or more pieces of feature information pertaining to a person in charge, of the plurality of persons in charge, and operator availability information, and
the at least one processor is configured to:
(i) receive, via the communication interface, position information and line-of-sight target information output by a user terminal that displays a virtual space image and includes at least one of a camera and a wearable head-mounted display having a gyro sensor, the position information including any of a position, of a first avatar of a user in a world coordinate system of a virtual space, and a record of the position of the first avatar of the user in the world coordinate system of the virtual space, and the line-of-sight target information including a line-of-sight target existing in a line-of-sight direction of the user in the virtual space or a record of the line-of-sight target, the line-of-sight direction being identified at the user terminal based on at least one of:
(A) an image captured by the camera,
(B) an orientation detected by the gyro sensor, and
(C) a center region of the virtual space image;

(ii) determine, for each of the plurality of persons in charge, scores indicating a degree of suitability based on the position information and the line-of-sight target information with reference to the person-in-charge information stored in the storage section;
(iii) select, based on the scores, a first person in charge to deal with the user in the virtual space;
(iv) cause a second avatar acting in the virtual space to be controlled in accordance with first input operations received from a first operator terminal corresponding to the first person in charge;
(v) when, during dealing with the user by the first person in charge, the processor selects a second person in charge different from the first person in charge based on an update to the position information and the line-of-sight target information, and cause the second avatar to be controlled in accordance with second input operations, received from a second operator terminal corresponding to the second person in charge, instead of the first input operations received from the first operator terminal, without changing an appearance of the second avatar displayed to the user, and the person in charge is one of the first person in charge and the second person in charge; and
(vi) output, to at least one of the user terminal and an operator terminal corresponding to a selected person in charge, reason information that includes feature information, of the one or more pieces of feature information, which has contributed to a selection result and that indicates a reason that the person in charge has been selected.

2. The virtual space changing apparatus according to claim 1, wherein:
in receiving the position information and the line-of-sight target information, the at least one processor further acquires feeling information that includes at least one of a feeling of the user and a record of the feeling; and
in selecting the first person in charge, the at least one processor selects the person in charge based further on the feeling information.

3. The virtual space changing apparatus according to claim 1, wherein:
in receiving the position information and the line-of-sight target information, the at least one processor further acquires at least one of feeling information, including a feeling of the first person in charge who is dealing with the user, and a record of the feeling.

4. The virtual space changing apparatus according to claim 1, wherein:
the at least one processor further configured to carry out an updating process of updating the person-in-charge information based on evaluation information that indicates evaluation by the user with respect to the person in charge.

5. The virtual space changing apparatus according to claim 1, wherein:
in receiving the position information and the line-of-sight target information, the at least one processor selects the plurality of persons in charge; and
the at least one processor is further configured to carry out a generation process of generating the second avatar.

6. A virtual space changing method, comprising:
storing person-in-charge information of a plurality of persons in charge, the person-in-charge information including one or more pieces of feature information pertaining to a person in charge, of the plurality of persons in charge, and operator availability information, and receiving, via a communication interface of a server, position information and line-of-sight target information output by a user terminal that displays a virtual space image and includes at least one of a camera and a wearable head-mounted display having a gyro sensor, the position information including any of a position, of a first avatar of a user in a world coordinate system of a virtual space, and a record of the position of the first avatar of the user in the world coordinate system of the virtual space, and the line-of-sight target information including a line-of-sight target existing in a line-of-sight direction of the user in the virtual space or a record of the line-of-sight target, the line-of-sight direction being identified at the user terminal based on at least one of:

(A) an image captured by the camera, (B) an orientation detected by the gyro sensor, and (C) a center region of the virtual space image;

determining, for each of the plurality of persons in charge, scores indicating a degree of suitability based on the position information and the line-of-sight target information with reference to the person-in-charge information;

selecting, based on the scores, a first person in charge to deal with the user in the virtual space;

causing a second avatar acting in the virtual space to be controlled in accordance with first input operations received from a first operator terminal corresponding to the first person in charge;

when, during dealing with the user by the first person in charge, selecting a second person in charge different from the first person in charge based on an update to the position information and the line-of-sight target information, and causing the second avatar to be controlled in accordance with second input operations, received from a second operator terminal corresponding to the second person in charge, instead of the first input operations received from the first operator terminal, without changing an appearance of the second avatar displayed to the user, and the person in charge is one of the first person in charge and the second person in charge; and outputting, to at least one of the user terminal and an operator terminal corresponding to a selected person in charge, reason information that includes feature information, of the one or more pieces of feature information, which has contributed to a selection result and that indicates a reason that the person in charge has been selected.

7. A non-transitory storage medium storing a program for causing a computer to function as a virtual space changing apparatus, the program causing the computer to carry out:

storing person-in-charge information of a plurality of persons in charge, the person-in-charge information including one or more pieces of feature information pertaining to a person in charge, of the plurality of persons in charge, and operator availability information, and receiving, via a communication interface of a server, position information and line-of-sight target information output by a user terminal that displays a virtual space image and includes at least one of a camera and a wearable head-mounted display having a gyro sensor, the position information including any of a position, of a first avatar of a user in a world coordinate system of a virtual space, and a record of the position of the first avatar of the user in the world coordinate system of the virtual space, and the line-of-sight target information including a line-of-sight target existing in a line-of-sight direction of the user in the virtual space or a record of the line-of-sight target, the line-of-sight direction being identified at the user terminal based on at least one of:

(A) an image captured by the camera, (B) an orientation detected by the gyro sensor, and (C) a center region of the virtual space image;

determining, for each of the plurality of persons in charge, scores indicating a degree of suitability based on the position information and the line-of-sight target information with reference to the person-in-charge information;

selecting, based on the scores, a first person in charge to deal with the user in the virtual space;

causing a second avatar acting in the virtual space to be controlled in accordance with first input operations received from a first operator terminal corresponding to the first person in charge;

when, during dealing with the user by the first person in charge, selecting a second person in charge different from the first person in charge based on an update to the position information and the line-of-sight target information, and causing the second avatar to be controlled in accordance with second input operations, received from a second operator terminal corresponding to the second person in charge, instead of the first input operations received from the first operator terminal, without changing an appearance of the second avatar displayed to the user, and the person in charge is one of the first person in charge and the second person in charge; and outputting, to at least one of the user terminal and an operator terminal corresponding to a selected person in charge, reason information that includes feature information, of the one or more pieces of feature information, which has contributed to a selection result and that indicates a reason that the person in charge has been selected.

* * * * *